United States Patent [19]

Gress

[11] 4,310,382

[45] Jan. 12, 1982

[54] METHOD OF AND A DEVICE FOR VAPORIZING AND RECOVERING WATER FROM AQUEOUS SOLUTIONS

[75] Inventor: Manfred Gress, Berlin, Fed. Rep. of Germany

[73] Assignee: Schering AG, Berlin and Bergkamen, Fed. Rep. of Germany

[21] Appl. No.: 115,559

[22] Filed: Jan. 21, 1980

[30] Foreign Application Priority Data

Jan. 25, 1979 [DE] Fed. Rep. of Germany ....... 2903008

[51] Int. Cl.³ .............................................. B01D 1/14
[52] U.S. Cl. ............................... 159/16 R; 159/48 R; 159/1 C; 159/24 A; 203/49; 203/26; 62/238.5; 62/324.4
[58] Field of Search ............................ 203/24, 26, 49; 159/16 R, 48 R, 48 L, 1 C, 24 A; 62/238 D, 324 D

[56] References Cited

U.S. PATENT DOCUMENTS

| | | | |
|---|---|---|---|
| 1,150,713 | 8/1915 | Soderlund | 203/26 |
| 1,254,423 | 1/1918 | Mason | 159/16 R |
| 3,091,098 | 5/1963 | Bowers | 203/26 |
| 3,234,109 | 2/1966 | Lustenader | 159/24 A |
| 3,404,537 | 10/1968 | Leonard, Jr. | 203/49 |
| 3,833,044 | 9/1974 | Wallace | 203/49 |

Primary Examiner—Norman Yudkoff
Attorney, Agent, or Firm—Michael J. Striker

[57] ABSTRACT

The method of recovering water by vaporizing aqueous solutions employs a heat pump circuit having a compressor, condensor, extention valve and evaporator for a heat transfer medium. The circulation channel for a gas stream which is capable of absorbing water vapor includes a gas washing station into which is sprayed the aqueous solution to be vaporized. The gas stream is guided past the condensor of the heat pump which acts as a heater and the heated gas is delivered into the gas washing station where is absorbs water. The water saturated gas stream is fed past the evaporator which acts as a refrigerating device and the water contents from the gas stream is condensed on the evaporator and returned into a galvanizing bath for example.

5 Claims, 1 Drawing Figure

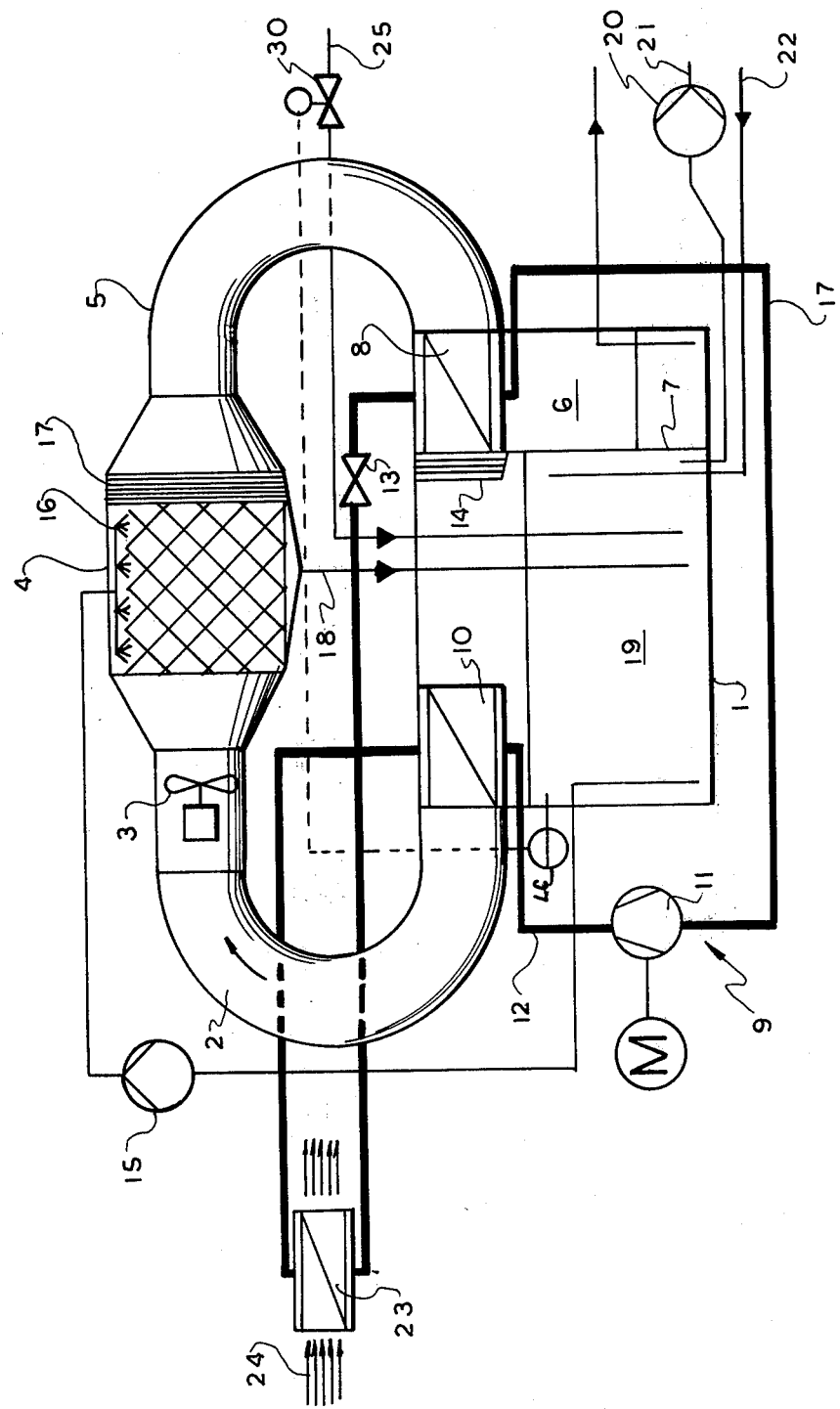

METHOD OF AND A DEVICE FOR VAPORIZING AND RECOVERING WATER FROM AQUEOUS SOLUTIONS

BACKGROUND OF THE INVENTION

The present invention relates in general to systems for evaporating a liquid and in particular to a method of and a device for evaporating and recovering water from agueous solutions.

In industrial processes, it is frequently desired to reduce the proportion of water in a liquid or to remove water from the liquid. In many cases, the extraction of water is the primary aim of such processes, nonetheless, the residual liquid is mostly also of interest. Particularly in the field of recovering valuable materials, new problems arise which necessitate the extraction of water from liquids or solutions containing such valuable materials.

For example, in the galvanization technology, efforts are made to recover dissolved valuable substances, from water which was used for rinsing. For this purpose, it is necessary either to separate such valuable substances from the water or to reduce the portion of water in the solution to such extent that upon the return of the solution into the active bath, the introduced amount of water is not larger than the losses of water occurring due to evaporation of the upper surface of the galvanizing bath. When recovery of metals from rinsing baths by means of electrolytic processes, an economic recovery can be made only upon the concentration of the solution. The application of this electrolytic method has, apart from the recovery of valuable material, the additional advantage in eliminating costs for purification or decontamination of waste water.

In active baths which operate at temperatures from about 60° centigrade and more, it is possible by applying suitable rinsing technology such as a multiple cascade emersion and rinsing or a multi-phase jet rinsing to return in the bath the whole amount of the rinsing water together with valuable substances contained therein inasmuch a corresponding amount of water evaporates from the surface of the bath.

If, however, the active bath is operated at low working temperatures it is impossible to return the rinsing water since the volume of the bath would continually increase.

In view of the recovery of precious substances and the saving of costs for the treatment of the resulting waste water, it is therefore, in many cases more economical to evaporate from the bath by means of a separate device a portion of water which corresponds to the required volume of rinsing water.

In many instances during the process taking place in the active bath there results excessive heat which anyhow has to be taken off. This is the case in various electrolytic processes using agueous solutions. It is possible to combine the cooling of such baths with the evaporation of a portion of water contained therein whereby rinsing water containing valuable substances can be returned again in the bath (German Publication No. 1 962 249).

If on the other hand, the imposed task is to withdrawn water from a liquid having a low temperature level without having for disposal any energy released during the process so in conventional methods the energy applied for the evaporation of water from the solution is lost. In addition, in such prior art methods high cost equipment is necessary for the evaporating process and in many cases the temperature which is necessary for evaporating water at the pressure of the outer atmosphere is detrimental to the contained valuable substances. It is true that it is possible to reduce the temperature by reducing the pressure above the treated liquid but the cost of apparatuses necessary for applying this so called vacuum evaporation process is so high that the whole process may become uneconomical.

By applying the evaporization method in the treated bath, there are required large amounts of air which according to ambient conditions may absorb additional moisture. Inasmuch the ambient air is frequently almost saturated with moisture the air must be heated up in order to produce the condition that the heated air be capable of absorbing and carrying additional moisture. Also, in the latter case, the supplied energy is lost and the operational costs are frequently so high that they prevent the application of this known method. Another serious disadvantage of the exhaust air vaporization is the occurrence of a chemical conversion such as the formation of carbonates between the components of the air such as carbon dioxide and the solution to be concentrated for example.

It has been also proposed that the air carrying the additional moisture be not discharged directly into the outer atmosphere but that it should be guided past a condenser whereby water in pure condition is recovered and can be returned into the process (German Published application No. 2 656 103). It is true that in this method the latent heat released due to the evaporization of the moisture is transferred to the condenser while the recovered heat is on such a low temperature that by conventional methods it cannot be effectively used for the process. Apart form the recovery of water, the application of a condenser in prior art methods therefore do not bring any advantages. For operating a condenser, it is in most cases, necessary to employ also a cooling machine because the existing cool water cannot attain such low temperatures which are required for condensation of moisture from the air.

SUMMARY OF THE INVENTION

It is therefore a general object of the present invention to overcome the aforementioned disadvantages.

More particularly, it is an object of the invention to provide an improved method of and device for withdrawing and recovering water or other useful liquids from agueous solutions which make it possible to almost fully recover the energy spent for the withdrawing process.

In keeping with these objects and others which will become apparent hereafter, one feature in the method of evaporizing and if desired of recovering water from agueous solutions resides in the steps of guiding a stream of a gas which is capable of absorbing water such as air, past a heat radiating member of a heat pump circuit, thereupon exposing the heated gas stream to the agueous solution whereby the gas absorbs an amount of water from the solution and thereupon the water saturated gas stream is guided past a cooling member of the heat pump circuit. The heat radiating member and the cooling member are respectively a condensor and an evaporator of the heat pump circuit.

In the preferred embodiment of the method of this invention, the heated gas stream is exposed to the agueous solution by means of a gas washing device whereby the released heat energy is employed preferably for heating another liquid and/or for evaporating an additional amount of water.

The agueous solutions are preferably all aqueous brines or salt solutions and/or sugar solutions as well as acids and bases diluted with water. In this category belong also sea waer and baths used for galvanization and/or for chemical surface treatment, such as for example, etching solutions containing diluted sulfuric acid.

The cooling member of the heat pump circuit used in the method of this invention can be for example, a commercially available evaporator for a heat transfer medium driven by a compressor. The preferred evaporation temperature of the heat transfer medium in the evaporator is about $+5°$ centigrade which is obtained from the gas stream, preferably air whereby the liquid heat transfer medium is completely evaporated. A direct evaporation takes place when the heat from the gas stream is transferred directly to the heat transfer medium of the water pump circuit; if on the other hand, the heat transfer takes place via an intermediate heat transfer medium such as an anti-freeze water solution, an indirect evaporation process takes place. The evaporator acting as the gas stream cooler in the method of this invention is made preferably in the form of a fin pipe heat exchanger. In order to insure a flawless distribution of the heat transfer medium in the evaporator, there are provided conventional spray valves and distributors. The average velocity of vapors in each evaporator pipe is preferably between 8 and 12 meters per second.

The gas stream heater employed in the method of this invention are for example condensers called also liquifiers in the form of fin pipes arranged downstream of a compressor of the heat pump circuit. Heat energy liberated from the heat transfer medium accumulates at the bottom of the condensor and is fed through an extension or throttle valve to the evaporator. The speed of the gas upstream of the heating member is preferably between 1.5 and 4.5 meters per second.

The condensation process can be made also directly or indirectly. In the case of indirect condensation there is provided an intermediate circuit of a heat transfer medium, preferably water.

The heat circuit further includes a compressor for transfering the low pressure transfer medium at the outlet of the evaporator to a high pressure heat transfer medium at the inlet of the condenser. The compressor suitable in the method of this invention can be a piston compressor but also other designs such as a rotary compressor or a turbor compressor can also be employed with advantage. As mentioned above, the function of the compressor is to suck in the cool low pressure vapors from the evaporator, to compress these vapors while increasing the temperature and supply the high pressure vapor into the condensor.

The device for carrying out the method of this invention includes therefore a gas stream cooling device, a gas stream heater, a gas stream washer, a -droplet separator and a container for the agueous solution. Materials suitable for the aforementioned component parts have to withstand the chemical attacks of the agueous solutions, gases, vapors and also have to withstand the temperature occurring during the process. The materials for this component parts can be suitable metals or plastic materials or metals coated with a plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates as schematic circuit diagram of a device for carrying out the method of evaporating water from agueous solutions according to this invention.

DESCRIPTION OF THE PREFERRED EMBODIMENTS

EXAMPLE 1

Referring to the FIGURE, there is illustrated a container 1 including a main compartment 19 for an aqueous solution such as a solution of cyanide of silver. The working silver bath itself is in a non-illustrated working container and must be kept at a temperature of about 25° centigrade. From the galvanized parts, the silver bath is partially rinsed off in the subsequent washing bath and should be recovered from the latter. For this purpose, the wash water from the first stage of a series of washing stages is returned into the container 1 via a conduit 25. The level control in the container 1 is effected by means of a level sensor LC and a level control valve 30. The upper part of closed container 1 serves also as a channel portion for guiding a circulating stream of water absorbing gas and communicates with another channel portion 2 accommodating a suction blower 3 for driving the circulating gas stream, perferably air. The blower 3 feeds the gas stream into a gas washer 4 from which the gas is returned via a channel portion 5 back into the container 1. Partition 7 separates the main compartment 19 of the container from an auxiliary compartment 6 for the condensate. Above the auxilliary compartment 6 is arranged an evaporator 8 of a heat pump circuit 9 which also includes a compressor 11 and a condensor 10, the latter being arranged at the mouth of the channel portion 2 at the other side of the container 1.

In this example, the heat pump circuit operates with a heat transfer medium on the basis of a fluoride containing hydro-carbon which is discharged from the compressor 11 in gaseous form at a hgh pressure of about 25 bars and is supplied through conduit 12 into condensor 10. The temperature of the supplied high pressure heat transfer medium is about 60° centigrade. In condensor 10 the heat transfer medium gives off heat and condenses in liquid state whereby the gas stream circulating through the condensor 10 into the channel portion 2 heats up to a temperature of about 45° centigrade. A residual condensation of the heat transfer medium takes place in an additional condensor 23 and the liquid heat transfer medium flows through an expansion or throttle valve 13 where it is expanded to a lower pressure of about 6 bars and is fed into the evaporator 8 where the low pressure liquid is completely evaporated into a gaseous state. For the evaporation process, a little amount of heat energy required is obtained from the gas stream flowing through the channel portion 5, past the evaporator 8 and into the upper part of container 1. While the low pressure heat transfer medium evaporates in evaporator 8 at about 5° centigrade, the gas stream guided past the evaporator 8 is cooled down to about 10° centigrade (sensitive temperature). The major portion of the heat energy which is necessary for evaporating the heat transfer medium in evaporator 8 originates from the latent heat liberated during the condensation of moisture or water contained in the gas stream. The condensate is discharged into the auxilliary compartment 6. A droplet separator 14 prevents the condensate from being entrained into the gas stream. Subsequently the gas stream flows past the condensor 10 and thus closes its circulating path while the evaporated heat transfer medium at the outlet of evaporator 8 is drawn through conduit 17 into compressor 11.

The mixture of silver bath with wash water in the main compartment 19 is supplied by means of a pump 15 into the gas washer 4 where it is sprayed through spraying nozzles 16 on a heat exchanging body having a large upper surface and a configuration which enables the saturation with water of the heated gas stream delivered into the washer 4 by the blower 3. Excessive moisture is discharged back into the container via a conduit 18. At the outlet of the gas washer 4, there is provided also a droplet separator 17 which prevents the entrainment of droplets of liquids into the saturated gas stream.

The saturated gas stream is guided past the upper surface of evaporator 8 which as mentioned above, cools the gas stream to a lower temperature whereby the condensed moisture is accumulated in the auxilliary compartment 6 and can be re-employed for washing the silver coated parts. The contents of the main compartment 19 of container 1 is re-circulated by means of pump 20 and conduits 21 and 22 into the working container where it is mixed up with the galvanizing bath. Inasmuch, the method of this invention removes from the agueous solution in the main compartment 19 substantially pure water only, the substances valuable for the silver plating process are completely recovered.

Heat energy required for the evaporation of water in gas washer 4 is transferred from the heat pump circuit 9 to the circulating gas stream at the condensor 10. Except of negligible losses, this heat energy is again recovered at the evaporator 8. If the heat pump circuit radiates heat energy in excess of that which is required for vaporizing moisture in the gas stream, the excess energy as mentioned above, is radiated in the illustrated condensor 23 for heating a second air stream 24 which can be employed for home heating. The heated second air stream which otherwise would have to be discharged into ambient atmosphere can be additionally employed for vaporizing moisture (exhaust air treatment). Another possibility how to employ the excessive energy of the heat pump circuit is the heating of another bath and/or of a heat accumulator.

EXAMPLE 2

In this example, an air stream is employed as the water absorbing gas circulating in the closed circuit driven by the blower 3. At the outlet of the evaporator 8, the air stream at a temperature of 10° centigrade has a moisture component of 7.8 grams per 1 kilogram. On passing condensor 10, the temperature of the air stream is increased to 45° centigrade. As a result, the air stream in gas wahser 4 is conditioned for receiving additional moisture and water content increases to 16.8 grams per kilogram whereas the temperature of the air stream passage of the air stream past the evaporator 8, the moisture is again drawn by condensation whereby the air is brought to the above described initial condition.

In order to evaporate in this manner 50 kilograms water per hour an air volume of about 4700 cubic meters has to be circulated per hour. The heat pump circuit consumes for its operations a power of about 22 kw.

With this power consumption, it is possible to achieve at abovedescribed operative conditions of the evaporator a heating effect of 54 kw.

It is possible to make a comparison between conventional methods for vaporizing and condensing water and the method of this invention whereby the amount of 50 kilograms per hour of water to be evaporated or condensed is taken as the basis. It is taken into account however, that in conventional methods there exists no constant conditions such as for example, the starting temperatures of the air stream and the moisture components carried in the air stream is fluctuating nonetheless, the differences between the two methods can be compared in the order of magnitude.

In the following comparison table, there are described parameters for evaporating and subsequent condensing of 50 kilograms per hour of water by means of 5556 kilograms per hour or air by employing (a) A conventional method in which an air heater heats up the air stream from 10° centigrade to 45° centigrade whereupon the air stream is exposed to moisture in a gas washer and whereupon the moisture is condensed in evaporator of a refrigerating machine; and (b) The method of this invention according to example 2.

|  | Conventional method (a) | method of this invention (b) |
| --- | --- | --- |
| Required heating power at the air heater (KW) | 54 | 54 |
| Energy consumption of the refrigerating machine for condensing of the amount of moisture | 22 | |
| Recovery of heat for condensation of moisture and cooling the air (KW) | — | 54 |
| Power consumption of the heat pump (KW) | | 22 |
| Total power consumption (KW) | 76 | 22 |
| Losses (KW) | 76 | 5 |
| Excess in energy for additional applications (KW) | — | 17 |

It will be understood that each of the elements described above, or two or more together, may also find a useful application in other types of construction of the device of this invention differing from the types described above.

While the invention has been illustrated and described as embodied in a specific example of a device for performing the methods of this invention, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for evaporating and recovering water from aqueous solutions, comprising a container for storing the solution; means defining a closed circulation channel communicating with the upper part of the container for conducting above the surface of the stored solution a stream of gas which is capable of absorbing moisture; a heat pump circuit, including a compressor for a heat transfer medium, a condensor arranged in said circulation channel to act as a heater for said circulating gas stream, an expansion valve and an evaporator arranged at another point in said circulation gas stream; a gas washing station including spraying means comprised of plural nozzles arranged in said circulation channel downstream of said condensor and upstream of said evaporator to expose the heated gas stream to a downwardly directed sprayed portion of the aqueous solution; condensate separating means arranged at the outlet of said evaporator to discharge condensed water content of said air stream; and means for transferring excessive heat energy not given off to said gas stream by said heat pump circuit, to an additional heat transfer medium for vaporizing additional amount of water.

2. A method of evaporating and recovering water from aqueous solutions stored in a closed container, comprising the steps of circulating above the surface of the solution in the container in a closed path to include the container, a stream of gas capable of absorbing water and directing the stream past a heating member of a heat pump circuit; thereupon exposing the heated gas stream to a sprayed portion of the aqueous solution which is sprayed through plural nozzles in a downward direction in the said path, to transfer heat energy to and to absorb water vapors from the latter; thereupon guiding the water saturated gas stream past a cooling member of the heat pump circuit whereby the moisture content condenses and heat is transferred from the gas stream to the cooling member; and transferring excessive heat energy not given off by the heating member to heat the gas stream, to an additional heat transfer medium for vaporizing additional amount of water.

3. The method as defined in claim 2, wherein said aqueous solution is sea water.

4. The method as defined in claim 2, wherein said aqueous solution is a bath for galvanizing processes or for chemical treatment processes.

5. The method as defined in claim 2, wherein said aqueous solution during its exposure to said heated gas stream is sprayed over a large heat exchanging surface.

* * * * *